(12) United States Patent
Johansson et al.

(10) Patent No.: US 9,489,097 B2
(45) Date of Patent: Nov. 8, 2016

(54) DYNAMIC TOUCH SENSOR SCANNING FOR FALSE BORDER TOUCH INPUT DETECTION

(71) Applicant: Sony Corporation, Tokyo (JP)

(72) Inventors: Magnus Johansson, Dösjebro (SE); Markus Andreasson, Lund (SE); Olivier Moliner, Lund (SE); Andreas Sandblad, Lund (SE); Ola Thörn, Limhamn (SE); Magnus Midholt, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 27 days.

(21) Appl. No.: 14/603,447

(22) Filed: Jan. 23, 2015

(65) Prior Publication Data

US 2016/0216796 A1 Jul. 28, 2016

(51) Int. Cl.
*G06F 3/045* (2006.01)
*G06F 3/044* (2006.01)
*G06F 3/041* (2006.01)

(52) U.S. Cl.
CPC ............. *G06F 3/044* (2013.01); *G06F 3/0412* (2013.01); *G06F 3/0416* (2013.01)

(58) Field of Classification Search
CPC .............................. G06F 3/044; G06F 3/0416
USPC ................. 345/173–184, 204, 214; 178/18.01–18.06, 19.03; 200/5 R, 341; 324/691
See application file for complete search history.

(56) References Cited

U.S. PATENT DOCUMENTS

| | | | | |
|---|---|---|---|---|
| 8,723,827 B2* | 5/2014 | Wright | ................. | G06F 1/3262 345/156 |
| 8,816,985 B1* | 8/2014 | Tate | ....................... | G06F 3/041 345/173 |
| 8,982,097 B1* | 3/2015 | Kuzo | ................... | G06F 3/0418 345/174 |
| 2010/0079384 A1* | 4/2010 | Grivna | ................... | G06F 3/041 345/173 |
| 2010/0245286 A1* | 9/2010 | Parker | .................. | G06F 3/0416 345/174 |
| 2012/0090757 A1 | 4/2012 | Buchan | | |

(Continued)

FOREIGN PATENT DOCUMENTS

| | | |
|---|---|---|
| EP | 2 570 897 A2 | 3/2013 |
| EP | 2 808 771 A1 | 12/2014 |

OTHER PUBLICATIONS

International Search Report and Written Opinion from corresponding International Application No. PCT/US2015/037922, mailed Sep. 16, 2015.

(Continued)

*Primary Examiner* — Prabodh M Dharia
(74) *Attorney, Agent, or Firm* — Tucker Ellis, LLP

(57) ABSTRACT

A device, having a touch screen display, performs a mutual capacitance scan of rows and columns of an array of capacitive touch sensors associated with the touch screen display. The device selects a subset of the rows, and a subset of the columns, of the array of capacitive touch sensors, and performs a self capacitance scan of the selected subset of the rows, and the selected subset of the columns, of the array of capacitive touch sensors based on results of the mutual capacitance scan. The device identifies an accidental or false touch input on the touch screen display based on results of the self capacitance scan.

15 Claims, 10 Drawing Sheets

(56) References Cited

U.S. PATENT DOCUMENTS

| | | | | |
|---|---|---|---|---|
| 2012/0278759 | A1* | 11/2012 | Curl | G06F 19/327 |
| | | | | 715/804 |
| 2013/0176281 | A1* | 7/2013 | Hotelling | G06F 3/044 |
| | | | | 345/174 |
| 2013/0194230 | A1* | 8/2013 | Kawaguchi | G06F 3/0416 |
| | | | | 345/174 |
| 2013/0265276 | A1* | 10/2013 | Obeidat | G06F 3/044 |
| | | | | 345/174 |
| 2014/0043265 | A1* | 2/2014 | Chang | G06F 3/04883 |
| | | | | 345/173 |
| 2014/0240280 | A1 | 8/2014 | Ekici | |
| 2014/0253504 | A1* | 9/2014 | Noshadi | H04M 1/72527 |
| | | | | 345/174 |
| 2014/0267146 | A1 | 9/2014 | Chang | |
| 2014/0278173 | A1* | 9/2014 | Elia | G01R 35/007 |
| | | | | 702/65 |
| 2014/0299365 | A1* | 10/2014 | Sebastian | G06F 3/044 |
| | | | | 174/255 |
| 2015/0002446 | A1* | 1/2015 | Ayzenberg | G06F 3/044 |
| | | | | 345/174 |
| 2015/0091859 | A1* | 4/2015 | Rosenberg | G06F 3/044 |
| | | | | 345/174 |
| 2015/0128288 | A1* | 5/2015 | Yablan | G06F 21/74 |
| | | | | 726/27 |
| 2015/0138153 | A1* | 5/2015 | Walley | G06F 3/044 |
| | | | | 345/174 |
| 2015/0309610 | A1* | 10/2015 | Rabii | G06F 3/044 |
| | | | | 345/174 |
| 2015/0349773 | A1* | 12/2015 | Gourevitch | H03K 17/9622 |
| | | | | 200/5 R |

OTHER PUBLICATIONS

Pushek Madaan and Priyadeep Kaur: "Capacitive Sensing Made Easy," Part 1: An Introduction to Different Capacitive Sensing Technologies, Cypress Semiconductor Corp., Apr. 2012, 8 pages. Retrieved online http://www.cypress.com/?docID=36129.

Capacitive sensing, From Wikipedia, print date: Jan. 23, 2015, 4 pages. Retrieved online http://en.wikipedia.org/wiki/Capacitive_sensing.

Touch Technology Brief: Projected Capacitive Technology. 3M Touch Systems; PCT Tech Brief—1013, 2013, 8 pages. Retrieved online http://multimedia.3m.com/mws/mediawebserver?mwsId=66666UgxGCuNyXTtO8TEmxfXEVtQEcuZgVs6EVs6E666666--&fn=Projected%20Capacitive%20Technology.

* cited by examiner

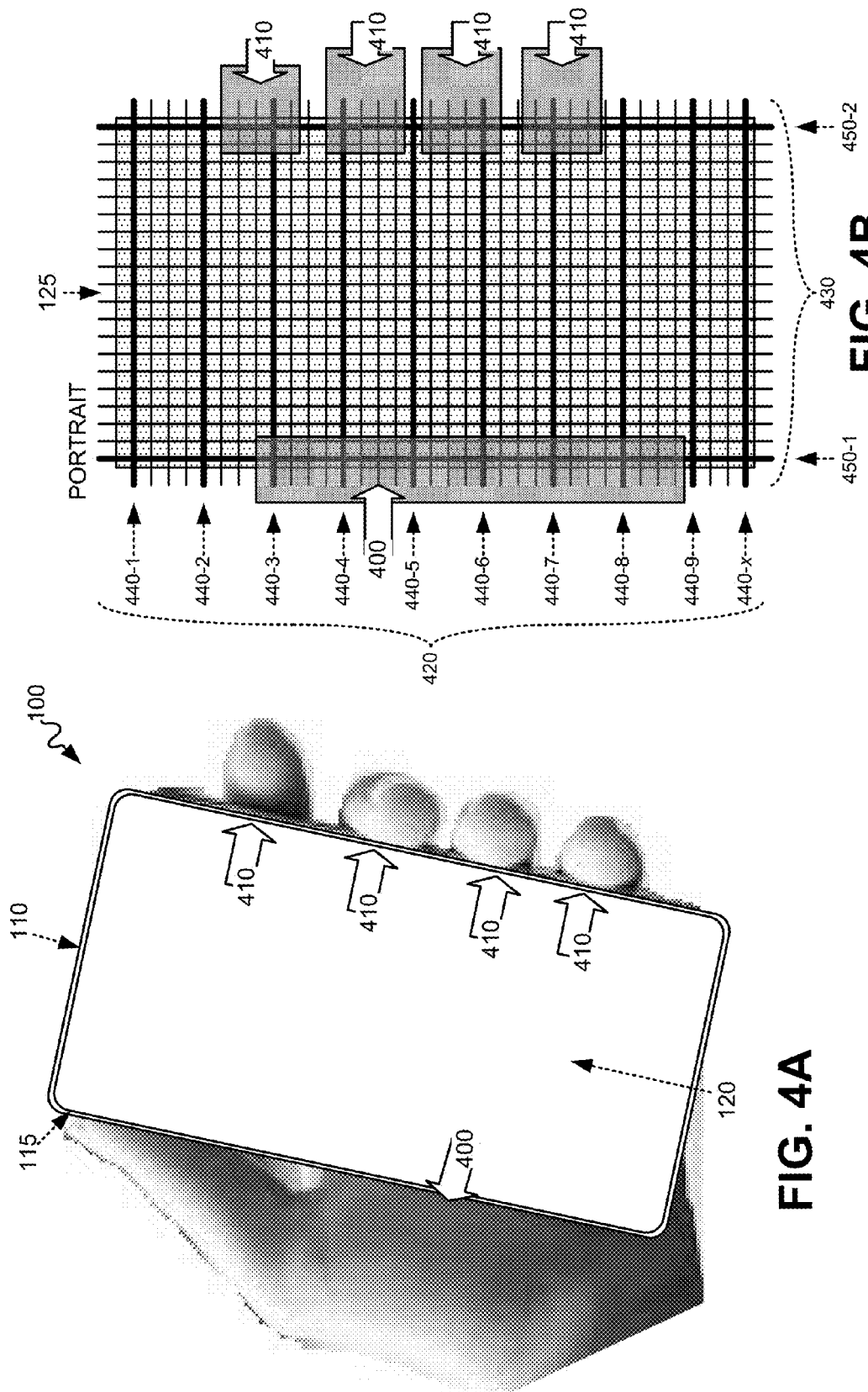

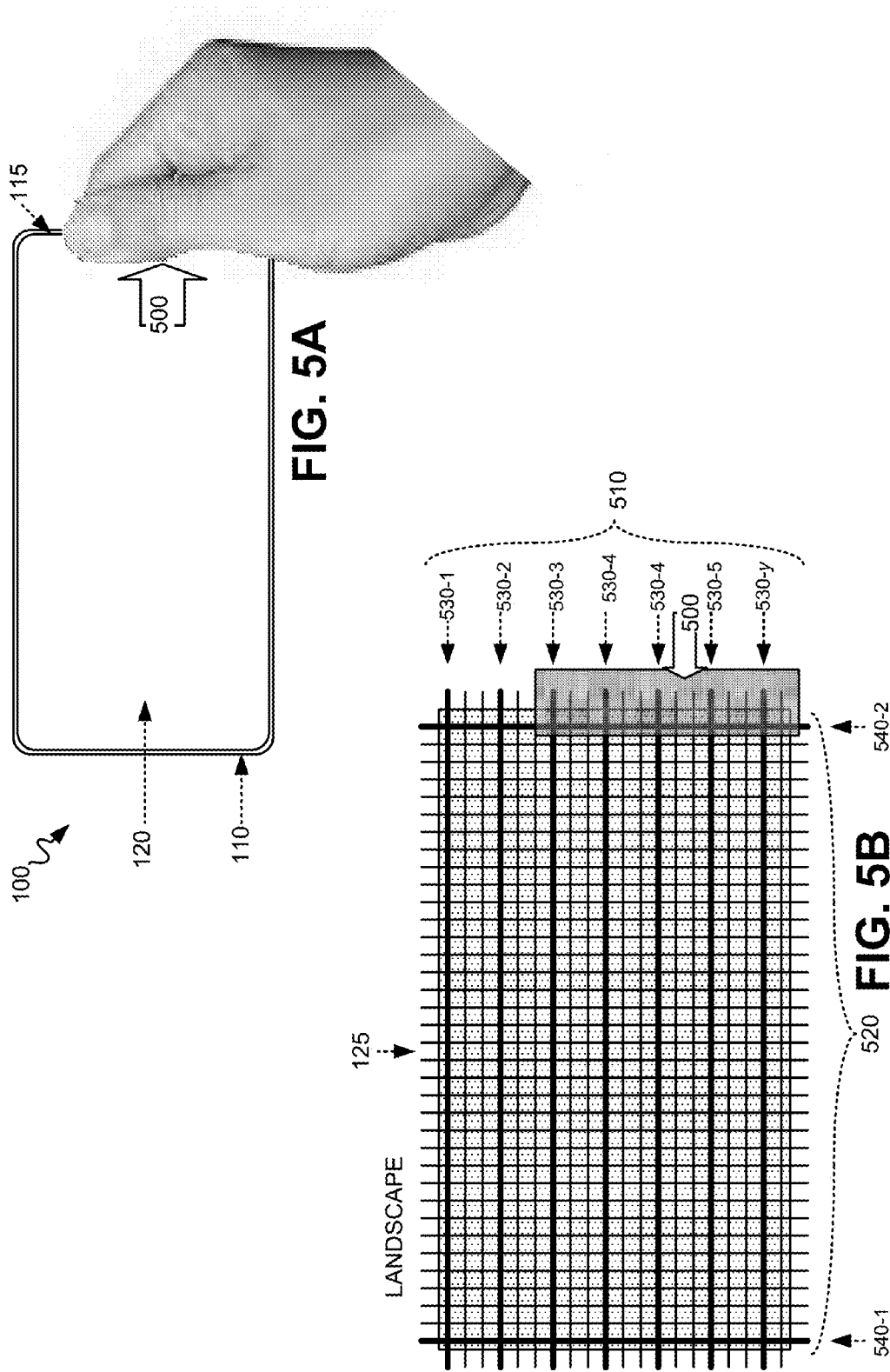

DYNAMIC TOUCH SENSOR SCANNING FOR FALSE BORDER TOUCH INPUT DETECTION

BACKGROUND

Many different types of consumer electronics devices typically include a touch screen that may act as an output device that displays image, video and/or graphical information, and which further may act as an input touch interface device for receiving touch control inputs from a user. A touch screen (or touch panel, or touch panel display) may detect the presence and location of a touch within the area of the display, where the touch may include a touching of the display with a body part (e.g., a finger) or with certain objects (e.g., a stylus). Touch screens typically enable the user to interact directly with what is being displayed, rather than indirectly with a cursor controlled by a mouse or touchpad. Touch screens have become widespread in use with various different types of consumer electronic devices, including, for example, cellular radiotelephones, personal digital assistants (PDAs), and hand-held gaming devices.

The sizes of touch screens in consumer electronic devices have steadily increased, with the border around the touch screen, on the face of the electronic devices, correspondingly decreasing and becoming thinner and thinner. With the very thin display borders on many consumer electronic devices, accidental or false touches may occur resulting, for example, from how the device user holds the electronic device. For example, a portion of the user's palm, or portions of the user's gripping fingers, may wrap around the face of the device and extend beyond the very thin border into the touch panel area of the device, thus, causing an accidental touch upon the touch panel.

SUMMARY

In one exemplary embodiment, a method includes performing, at a device having a touch screen display, a mutual capacitance scan of rows and columns of an array of capacitive touch sensors associated with the touch screen display, and selecting a subset of the rows, and a subset of the columns, of the array of capacitive touch sensors. The method further includes performing a self capacitance scan of the selected subset of the rows, and the selected subset of the columns, of the array of capacitive touch sensors based on results of the mutual capacitance scan, and identifying an accidental or false touch input on the touch screen display based on results of the self capacitance scan.

In another exemplary embodiment, a device includes a touch screen display comprising a first layer of capacitive touch sensors including multiple rows of sensor electrodes, and a second layer of capacitive touch sensors including multiple columns of sensor electrodes. The device further includes a first scanning unit configured to perform a mutual capacitance scan of the multiple rows and columns of the layers of capacitive touch sensors, and a selection unit configured to select a subset of the rows, and a subset of the columns, of the capacitive touch sensors. The device also includes a second scanning unit configured to perform a self capacitance scan of the selected subset of rows, and the selected subset of the columns, of the capacitive touch sensors based on results of the mutual capacitance scan, and an input detection unit configured to identify an accidental touch input on the touch screen display based on results of the self capacitance scan.

In yet another exemplary embodiment, a non-transitory computer-readable medium, containing instructions executable by at least one processor, includes one or more instructions for performing, at a device having a touch screen display, a first scan of rows and columns of an array of capacitive touch sensors associated with the touch screen display. The non-transitory computer-readable medium further includes one or more instructions for selecting a subset of the rows, and a subset of the columns, of the array of capacitive touch sensors associated with the touch screen display; and one or more instructions for performing a second scan of the selected subset of second rows, and the selected subset of the second columns, of the array of capacitive touch sensors based on results of the first scan. The non-transitory computer-readable medium also includes one or more instructions for identifying an accidental or false touch input on the touch screen display based on results of the second scan.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIGS. 4A and 4B are diagrams that depict an example of dynamic row/column selection of the touch input sensor array of FIGS. 1A-1G for self capacitive scanning when the electronic device is held in a portrait orientation;

FIGS. 5A and 5B are diagrams that depict an example of dynamic row/column selection of the touch input sensor array of FIGS. 1A-1G for self capacitive scanning when the electronic device is held in a landscape orientation.

DETAILED DESCRIPTION

The following detailed description refers to the accompanying drawings. The same reference numbers in different drawings may identify the same or similar elements. Also, the following detailed description does not limit the invention.

Figure 1A:
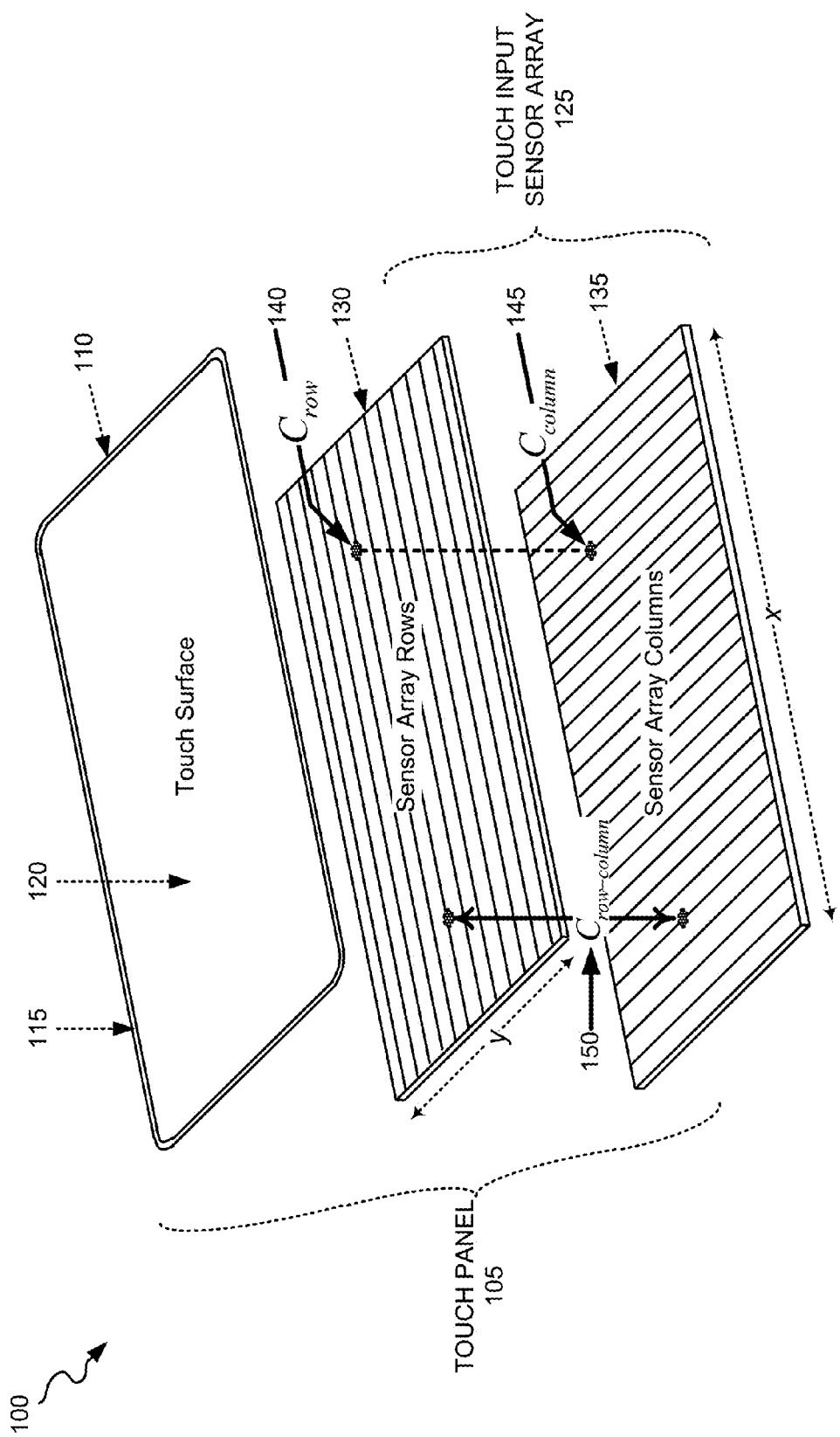
FIGS. 1A-1G are diagrams that illustrate the use of a touch panel of a touch screen display of an electronic device for performing dynamic touch sensor scanning for false border detection.
Figure 1C:
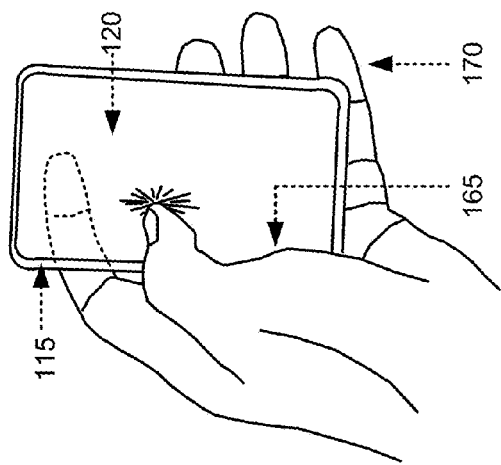
Figure 1B:
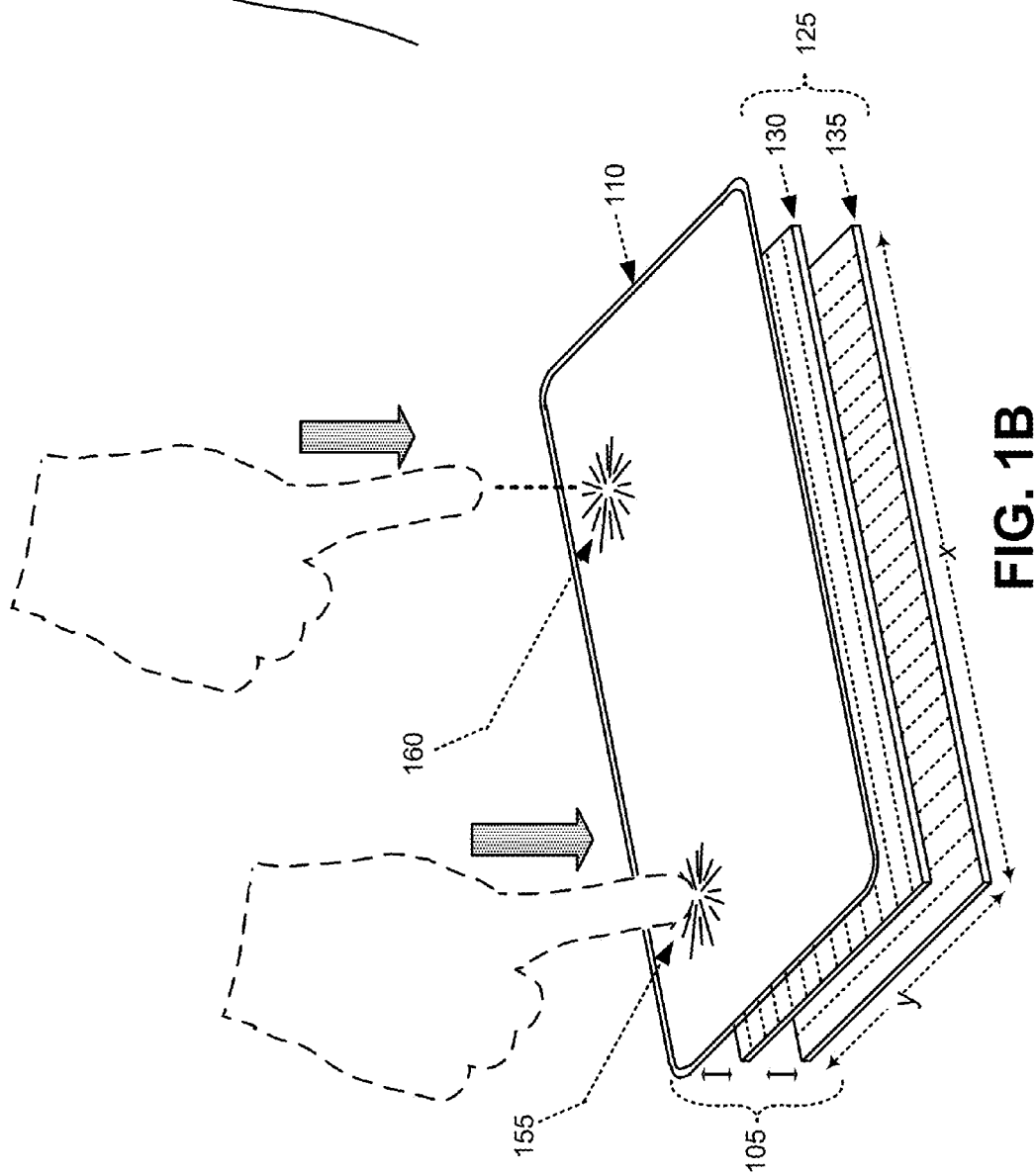

FIGS. 1A-1G illustrate the use of a touch panel 105 of a touch screen display of an electronic device 100 for performing dynamic touch sensor scanning for false border touch input detection. Touch panel 105, as depicted in FIGS. 1A and 1B, does not include other components of the touch screen display of device 100 for purposes of simplicity. Electronic device 100 may include any type of electronic device that includes a touch screen display. For example, device 100 may include a cellular radiotelephone; a satellite navigation device; a smart phone; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; a gaming device; a media player device; a tablet computer; a surface table with touch screen display; a wearable computer (e.g., in the form of a watch or glasses); or a digital camera. In some exemplary embodiments, device 100 may include a handheld electronic device. In one implementation, device 100 may include a device having a projected display with, for example, a projected user interface.

Touch panel 105 may be integrated with, and/or overlaid on, a display to form a touch screen or a panel-enabled display that may function as a user input interface. For example, in one implementation, touch panel 105 may include a capacitive type of touch panel that allows a touch screen display to be used as an input device. The capacitive type of touch panel may include both a self capacitance and a mutual capacitance type of touch panel (e.g., a Floating Touch™ display using self capacitance and mutual capacitance scanning). In other implementations, other types of near field-sensitive, acoustically-sensitive (e.g., surface acoustic wave), photo-sensitive (e.g., infrared), and/or any other type of touch panel may be used that allows a display to be used as an input device. In some implementations, touch panel 105 may include multiple touch-sensitive technologies. Generally, touch panel 105 may include any kind of technology that provides the ability to identify the occurrence of a touch upon touch panel 105.

The display (e.g., touch surface 120 shown in FIG. 1A) associated with touch panel 105 may include a device that can display signals generated by the electronic device 100 as text or images on a screen (e.g., a liquid crystal display (LCD), a cathode ray tube (CRT) display, a light emitting diode (LED) display such as an organic light-emitting diode (OLED) display, a surface-conduction electro-emitter display (SED), a plasma display, a field emission display (FED), a bistable display, etc.). In certain implementations, the display may provide a high-resolution, active-matrix presentation suitable for the wide variety of applications and features associated with typical devices. The display may provide visual information to the user and serve—in conjunction with touch panel 105—as a user interface to detect user input. The terms "touch" or "touch input," as used herein, may refer to a touch of an object upon touch panel 105, such as a body part (e.g., a finger) or a pointing device, or movement of an object (e.g., body part or pointing device) to within a certain proximity of touch panel 105 that can be sensed as a "touch" by touch panel 105.

In the exemplary implementation depicted in FIGS. 1A and 1B, touch panel 105 includes an external face 110 of electronic device 100 that further includes a very thin or narrow border area 115 and a touch surface 120. In some implementations, touch surface 120 may include the display for device 100. As shown in the exploded view of FIG. 1A, touch panel 105 further includes a touch input sensor array 125, each having arrays of sensors for detecting a touch input upon touch panel 105. Touch input sensor array 125 may further include a first layer 130 having multiple parallel rows of capacitive electrodes extending in a y direction (as shown in FIG. 1A). Touch input sensor array 125 may also include a second layer 135 having multiple parallel columns of capacitive electrodes extending in an x direction that is perpendicular to the y direction (as shown in FIG. 1A). Layers 130 and 135 may be separated by a layer of material, such as, for example, a dielectric layer. The parallel rows of the capacitive sensors of layer 130 may be perpendicular to the parallel columns of the capacitive sensors of layer 135.

Device 100 may perform, as described further herein, "mutual capacitance" scanning and "self capacitance" scanning of touch input sensor array 125. During self capacitance scanning of layers 130 and 135 of sensor array 125, a voltage is applied to each row of layer 130 and to each column of layer 135. When a finger, or other object, is near, or touching, touch surface 120, a capacitance $C_{row}$ 140 associated with an underlying row electrode of layer 130 increases, and a capacitance $C_{column}$ 145 associated with an underlying column electrode of layer 135 increases. By detecting the increases in capacitance, the location of the finger, or other object, near or touching touch surface 120 can be determined by the intersection of the row electrode of layer 130 having an increased capacitance with the column electrode of layer 135 having an increased capacitance. During this "self capacitance" scanning of touch input sensor array 125, the current on each row and column electrode may be measured to ground to determine the change in capacitance.

During "mutual capacitance" scanning of layers 130 and 135, a voltage is applied to a parallel plate capacitor effectively formed at an intersection of each row of layer 130 and column of layer 135. Each intersection of a row of layer 130 and a column of layer 135 represents a single mutual capacitance sensor of array 125. When a finger(s), or other object(s), touches touch surface 120, a capacitance $C_{row\text{-}column}$ 150 associated with an intersection, at a location of the touch, of a row electrode of layer 130 and a column electrode of layer 135 decreases. By detecting the decreases in capacitance at one or more row/column intersections, the location of the finger(s), or other object(s), touching touch surface 120 can be determined. During this "mutual capacitance" scanning of touch input sensor array 125, the capacitance $C_{row\text{-}column}$ 150 at each intersection of a row of layer 130 and a column 135 of layer 135 may be measured to determine the change in capacitance.

Self capacitance scanning of sensor array 125 may result in higher output signal levels for a given touch input than mutual capacitance scanning of sensor array 125. Self capacitance scans of sensor array 125, therefore, may be more sensitive and capable of detecting smaller objects at, or near, touch surface 120, and capable of detecting lighter touches at touch surface 120, relative to mutual capacitance scans.

FIG. 1B depicts another exploded view of touch panel 105 where different touch inputs 150 and 155 are occurring upon touch surface 120. In FIG. 1B, the object (on the left) touching touch surface 120, or the object moving within a certain proximity of touch surface 120 (on the right), is depicted as a finger. As shown on the left in FIG. 1B, touch input sensor array 125 may enable touch input 155 to be detected when the object (e.g., finger) touches touch panel 105. As further shown on the right in FIG. 1B, touch input sensor array 125 of touch panel 105 may enable a touch input 160 to be detected when the object (e.g., finger) moves within a certain proximity of touch panel 105 even when the object has not physically touched touch panel 105.

As further shown in FIG. 1C, during operation and use of device 100, a user of device 100 may hold device 100 in a manner such that portions of the user's hand(s) may accidentally extend over border 115 to contact touch surface 120 of device 100, thereby possibly causing a false/accidental touch detection. As depicted in FIG. 1C, for example, a portion 165 of the palm of the user's hand, or a portion of one or more fingers 170 may extend beyond border 115 to contact regions of touch surface 120 of a front face of device 100. Exemplary techniques, described in further detail herein, use dynamic touch sensor scanning to identify accidental and false touches upon touch surface 120 of device 100.

Figure 1D:
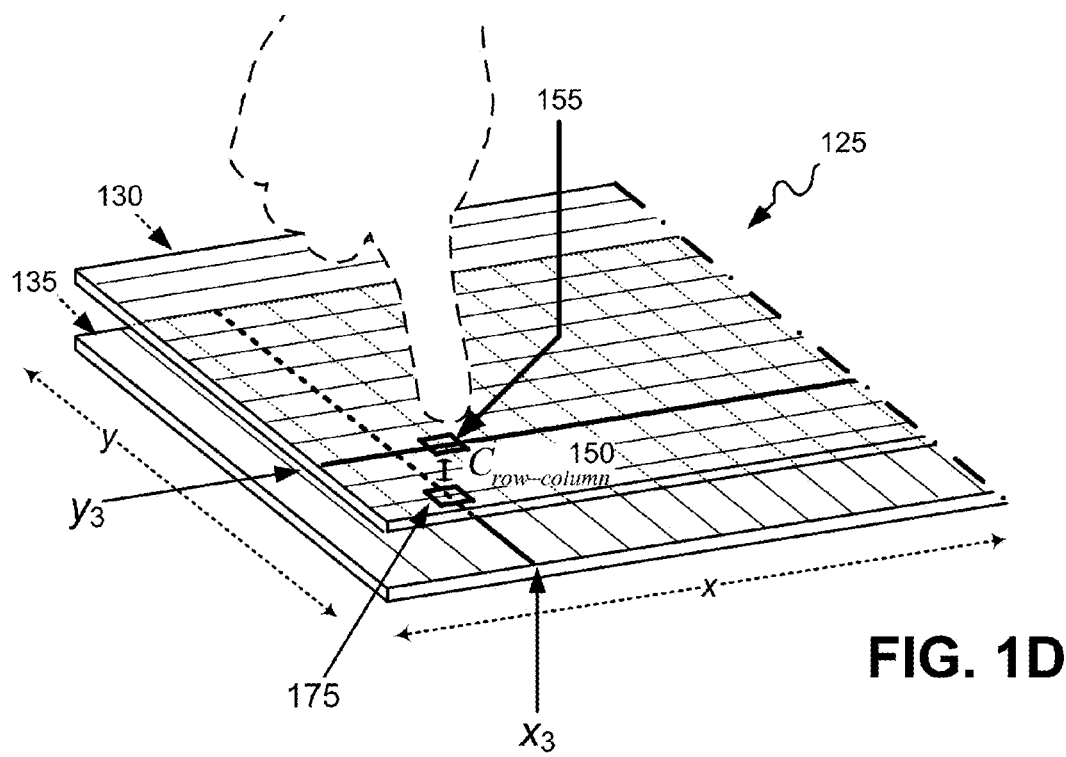
Figure 1E:
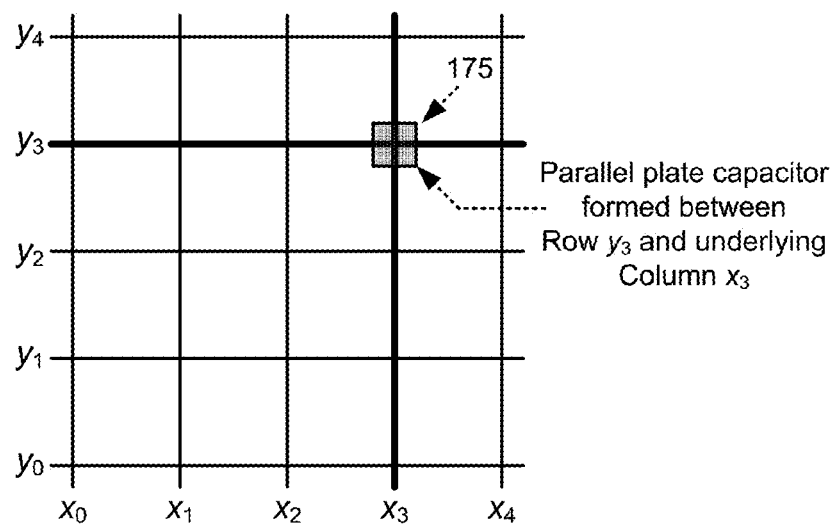

FIGS. 1D and 1E depict an example of a mutual capacitance scan of sensor array 125. When touch input 155 occurs on, or near, touch input sensor array 125 of touch panel 105, capacitance $C_{row\text{-}column}$ 150 associated with an intersection, at a location of the touch, of a row electrode of layer 130 and a column electrode of layer 135 decreases. The intersection of the row electrode of layer 130 and the underlying column electrode of layer 135, beneath touch input 155, effectively acts as a parallel plate capacitor whose capacitance decreases with the touch input at the intersection. Every intersection of a row of layer 130 and a column of layer 135 of sensor array 125, therefore, acts as a parallel plate capacitor whose capacitance can be measured to detect touch input at the location of the intersection. By detecting the decreases in capacitance at one or more row/column intersections, the location of the finger(s), or other object(s), touching touch surface 120 can be determined. FIGS. 1D and 1E depict an example of a touch input 155 that occurs at the intersection of row $y_3$ of layer 130 and column $x_3$ of layer 135 of sensor array 125. As shown in FIGS. 1D and 1E, the capacitance $C_{row\text{-}column}$ 150 can be measured between row $y_3$ and column $x_3$ at the intersection, which acts as a parallel plate capacitor 175, to identify the occurrence of touch input 155 and the location of touch input 155.

Figure 1F:
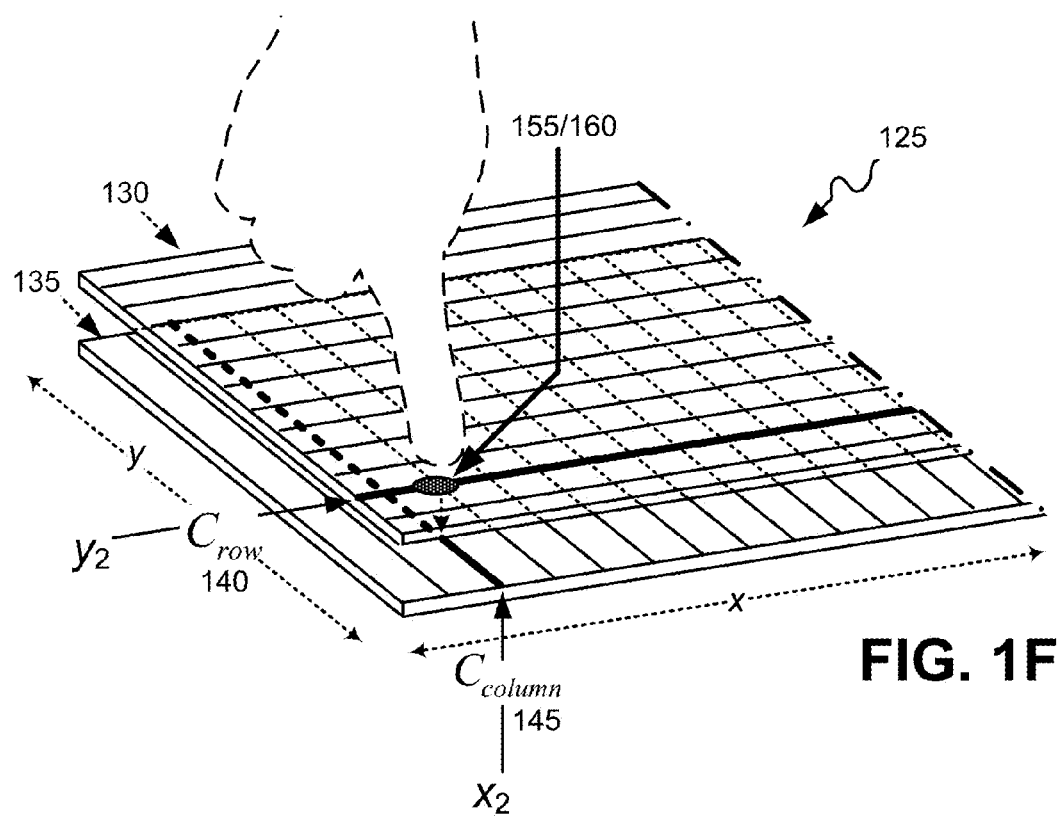
Figure 1G:
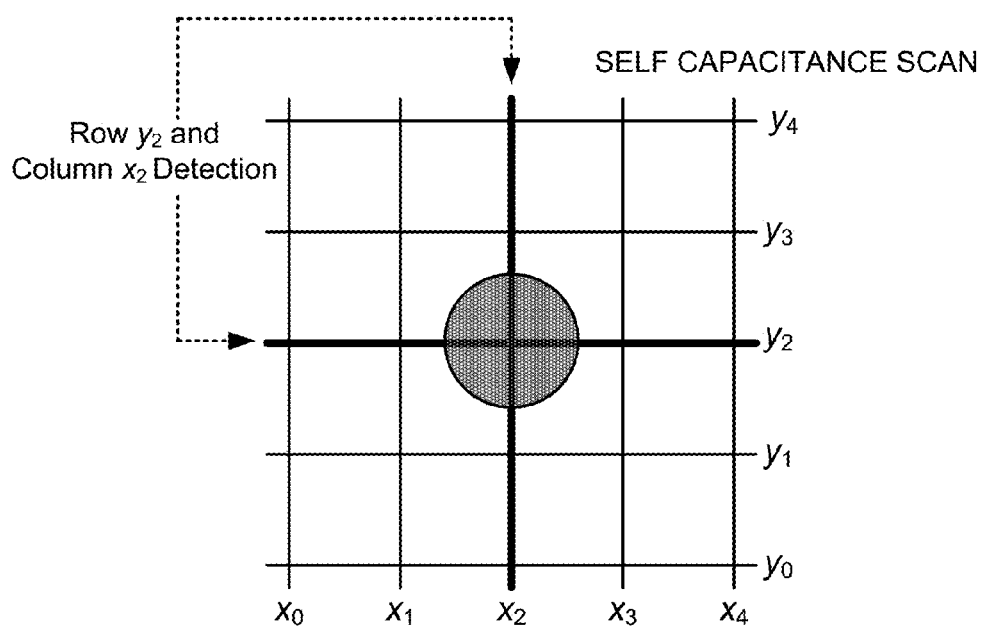

FIGS. 1F and 1G depict an example of a self capacitance scan of sensor array 125. When touch input 155 or 160 occurs on, or near, sensor array 125 of touch panel 105, a capacitance $C_{row}$ 140 associated with a row electrode of layer 130 increases, and a capacitance $C_{column}$ 145 associated with a column electrode of layer 135 increases. By detecting the increases in capacitance, the location of the finger, or other object, near or touching touch surface 120 can be interpolated by knowing the location of the intersection of the row electrode of layer 130 having an increased capacitance, and the column electrode of layer 135 having an increased capacitance. During this "self capacitance" scanning of touch input sensor array 125, a current on each row and column electrode may be measured to ground to determine the change in capacitance. FIGS. 1F and 1G depict an example of a touch input 155/160 that occurs at the intersection of row $y_2$ of layer 130 and column $x_2$ of layer 135 of sensor array 125. As shown in FIGS. 1F and 1G, the capacitance $C_{row}$ 140 of the row electrode $y_2$ can be measured to detect an increase in capacitance, and the capacitance $C_{column}$ 145 of the column electrode $x_2$ can be measured to detect an increase in capacitance, indicating a touch 155/160 at the location of the intersection of row electrode $y_2$ and column electrode $x_2$.

Figure 2:
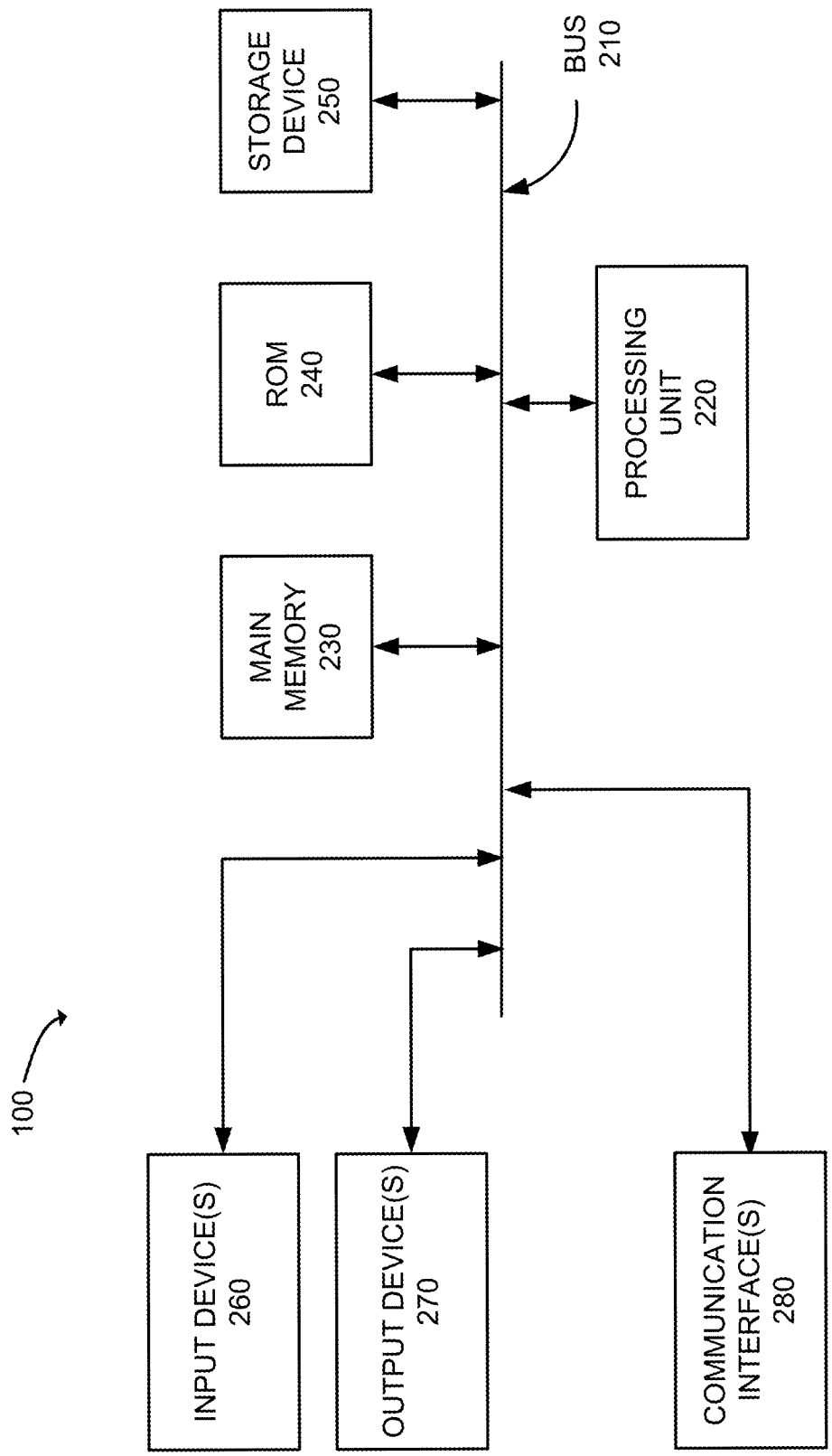
FIG. 2 is a block diagram that depicts exemplary components of the electronic device of FIG. 1A.
Figure 3:
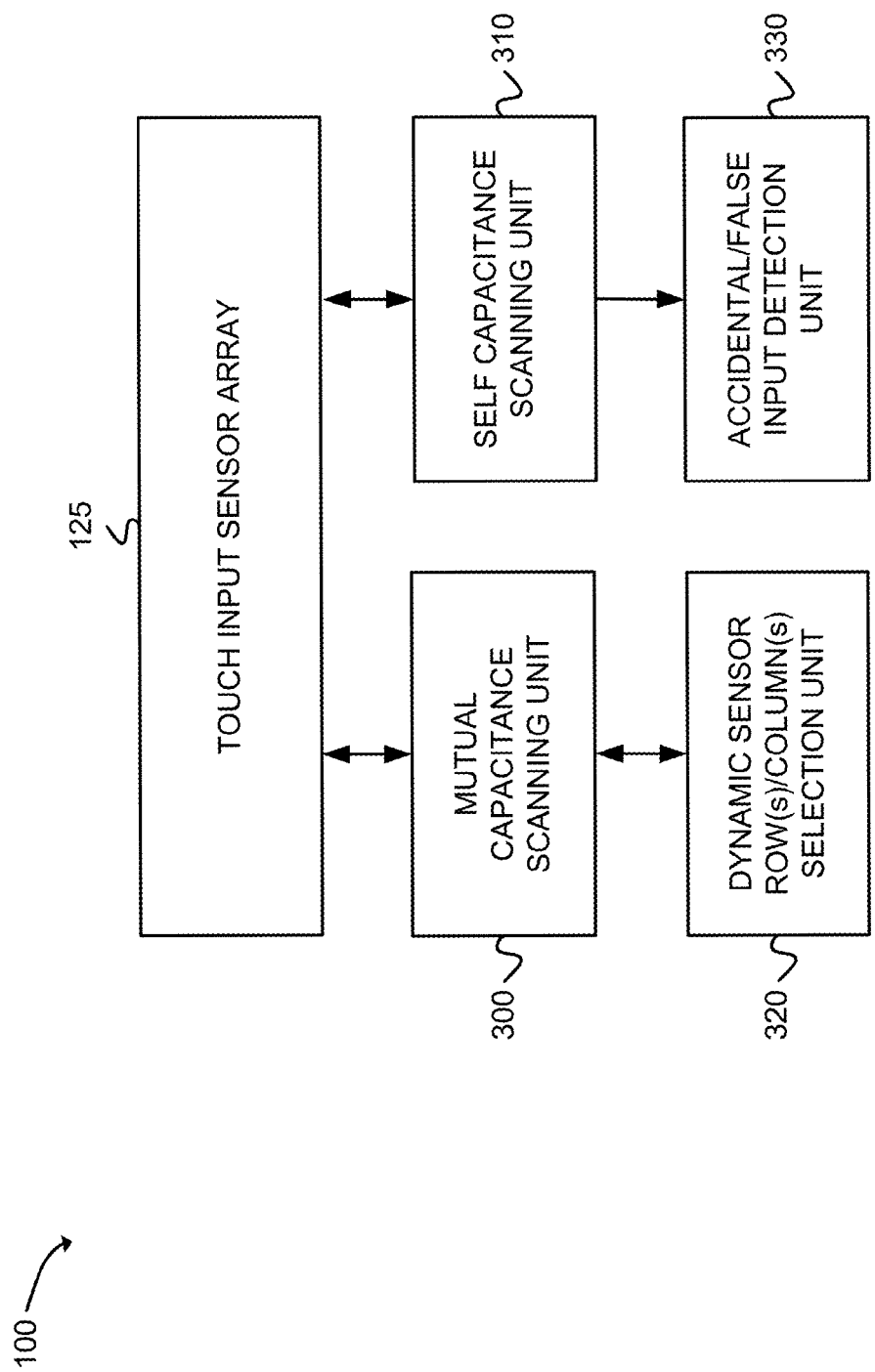
FIG. 3 depicts exemplary functional components of the electronic device of FIGS. 1A-1C.

FIG. 2 is a block diagram that depicts exemplary components of electronic device 100. As illustrated, electronic device 100 may include a bus 210, a processing unit 220, a main memory 230, a read only memory (ROM) 240, a storage device 250, an input device(s) 260, an output device(s) 270, and a communication interface(s) 280. Bus 210 may include a path that permits communication among the elements of device 100. Device 100 may include additionally include circuitry, not shown in FIG. 2, that is depicted in FIG. 3 below.

Processing unit 220 may include a processor, microprocessor, or processing logic that may interpret and execute instructions. Main memory 230 may include a random access memory (RAM) or another type of dynamic storage device that may store information and instructions for execution by processing unit 220. ROM 240 may include a ROM device or another type of static storage device that may store static information and instructions for use by processing unit 220. Storage device 250 may include a magnetic and/or optical recording medium and its corresponding drive. Main memory 230, ROM 240 and storage device 250 may each be referred to herein as a "tangible non-transitory computer-readable medium."

Input device 260 may include a mechanism that permits a user to input information to device 100, such as a mouse, a pen, voice recognition and/or biometric mechanisms, etc. Input device 260 may further include a touch screen display that includes touch panel 105. Output device 270 may include a mechanism that outputs information to the operator, including a display, a printer, a speaker, etc. Output device 270 may additionally include the touch screen display (e.g., touch panel 105) that also acts as an input device 260. Communication interface 280 may include a transceiver that enables device 100 to communicate with other devices and/or systems.

Device 100 may perform certain operations or processes described herein. Device 100 may perform these operations in response to processing unit 220 executing software instructions contained in a computer-readable medium, such as memory 230. A computer-readable medium may be defined as a physical or logical memory device. The software instructions may be read into memory 230 from another computer-readable medium, such as data storage device 250, or from another device via communication interface 280. The software instructions contained in memory 230 may cause processing unit 220 to perform operations or processes described herein. Alternatively, hardwired circuitry may be used in place of or in combination with software instructions to implement processes described herein. Thus, implementations described herein are not limited to any specific combination of hardware circuitry and software.

The configuration of components of device 100 illustrated in FIG. 2 is for illustrative purposes only. Other configurations may be implemented. Therefore, device 100 may include additional, fewer and/or different components, or differently arranged components, from those depicted in FIG. 2. For example, device 100 may include an accelerometer (not shown) for detecting a portrait or landscape orientation of face 110 of device 100.

FIG. 3 depicts exemplary functional components of electronic device 100. The functional components of device 100 depicted in FIG. 3 may be implemented using special purpose circuitry in conjunction with hardware or software executed processes (e.g., in conjunction with processing unit 220). As shown in FIG. 3, device 100 may include touch input sensor array 125, mutual capacitance scanning unit 300, self capacitance scanning unit 310, dynamic sensor row(s)/column(s) selection unit 320, and accidental/false input detection unit 330.

Mutual capacitance scanning unit 300, when performing "mutual capacitance" scanning of layers 130 and 135, applies a voltage to a parallel plate capacitor formed at an intersection of each row of layer 130 and column of layer 135 of sensor array 125. When a finger(s), or other object(s), touches touch surface 120, a capacitance $C_{row\text{-}column}$ 150 associated with an intersection, at a location of the touch, of a row electrode of layer 130 and a column electrode of layer 135 decreases. By measuring voltage and/or current at each row/column intersection, mutual capacitance scanning unit 300 detects the decreases in capacitance at one or more row/column intersections, and the location of the finger(s), or other object(s), touching touch surface 120 of device 100 may thereby be determined. Scanning unit 310 may then initiate dynamic sensor row(s)/column(s) selection unit 320 to select one or more rows and/or columns for scanning by self capacitance scanning unit 310, including providing data related to the mutual capacitance scan of touch input sensor array 125.

Dynamic sensor row(s)/column(s) selection unit 320, based on an instruction from scanning unit 300 and based on the provided data related to the mutual capacitance scan of touch input sensor array 125, may determine a display orientation of device 100 relative to the device user (i.e., portrait vs. landscape) and then select one or more rows and/or columns of self capacitance sensor array 125 for scanning by self capacitance scanning unit 310. Selection unit 320 may select the one or more rows or columns based on: 1) a display resolution of device 100, 2) the current orientation of device 100 (i.e., portrait vs. landscape), and/or 3) the results of the mutual capacitance scan. If sensor array 125 of device 100 has N×M rows and columns, then the one or more selected rows may include n rows where n<N or the one or more selected columns may include m columns, where m<M.

Self capacitance scanning unit 310 may perform "self capacitance" scanning of the one or more rows and columns of layers 130 and 135 selected by selection unit 320. Self capacitance scanning unit 310, when performing "self capacitance" scanning of layers 130 and 135 of touch input sensor array 125, applies a voltage to each selected row of layer 130 and/or to each selected column of layer 135. During this "self capacitance" scanning of touch input sensor array 125, the current on each selected row and column electrode may be measured to ground to determine the change in capacitance of each selected row and column electrode. When a finger, or other object, is near, or touching, touch surface 120, a capacitance $C_{row}$ 140 associated with a selected row electrode of layer 130 increases, and a capacitance $C_{column}$ 145 associated with a selected column electrode of layer 135 increases, thereby permitting interpolation of the location of the touch input as being the intersection of the row and column. Scanning unit 320 provides the results of the "self capacitance" scan of touch input sensor array 125 to accidental/false input detection unit 330. Accidental/false input detection unit 330 analyzes the results of the "self capacitance" scan and/or the results of the "mutual capacitance" scan of touch input sensor array 125 to identify an accidental and/or false touch panel input(s), and to issue instructions to ignore any identified accidental and/or false touch panel inputs.

FIGS. 4A and 4B depict an example of dynamic row/column selection of touch input sensor array 125 for "self capacitance" scanning performed by scanning unit 310 when electronic device 100 is held in a portrait orientation. As shown in FIG. 4A, a user's hand holds device 100 with external face 110 oriented in a portrait orientation with respect to the user's viewpoint. As further depicted in FIG. 4A, a palm and/or thumb 400, on one side of face 110, may extend beyond border 115 of external face 110 such that palm and/or thumb 400 touches touch surface 120 close to border 115, and multiple fingers 410, on an opposite side of face 110, may also extend beyond border 115 of face 110 such that the fingertips touch touch surface 120 close to border 115. FIG. 4B further shows touch input sensor array 125 of touch panel 105 with a first border detection region corresponding to palm and/or thumb 400 and multiple second border detection regions corresponding to fingers 410. With face 110 of device 100 being oriented in portrait, and having an array of rows 420 and columns 430 with the resolution shown, every qth row of rows 420 may be "self capacitance" scanned to detect accidental and/or false touches upon touch surface 120. In the example of FIG. 4B, q=4 and every fourth row of rows 420 of touch input sensor array 125 (i.e., rows 440-1 through 440-x) may be scanned to detect accidental and/or false touch input caused by palm and/or thumb 400 in the first border detection region and/or caused by fingers 410 in the multiple second border detection regions. The value of q may be selected as any integer greater than one based on, among other factors, face 110 of device 100 being oriented in portrait and based on a resolution of touch input sensor array 125. Additionally, during the "self capacitance" scan, one or more selected columns may be scanned, in addition to selected rows 440-1 through 440-x. For example, as shown in FIG. 4B, columns 450-1 and 450-2, being the columns on touch surface 120 nearest border 115, may be selected and scanned.

FIGS. 5A and 5B depict an example of dynamic row/column selection of touch input sensor array 125 for "self capacitance" scanning performed by scanning unit 310 when electronic device 100 is held in a landscape orientation with respect to the user's viewpoint. As shown in FIG. 5A, a user's hand holds device 100 with external face 110 oriented in landscape. As further depicted in FIG. 5A, a thumb and/or portion of a palm 500, on one side of face 110, may extend beyond border 115 of external face 110 such that thumb and/or palm portion 500 touches touch surface 120 close to border 115. FIG. 5B further shows touch input sensor array 125 of touch panel 105 with a border detection region corresponding to thumb and/or palm portion 500. With face 110 of device 100 being oriented in landscape, and having an array of columns 510 and rows 520 with the resolution shown, every sth column of columns 510 may be scanned to detect accidental and/or false touches upon touch surface 120. In the example of FIG. 5B, s=3 and every third column of columns 510 of touch input sensor array 125 (i.e., columns 530-1 through 530-y) may be "self capacitance" scanned to detect accidental and/or false touches caused by thumb and/or palm portion 500 in the border detection region. The value for s may be selected as any integer greater than one based on, among other factors, face 110 of device 100 being oriented in landscape and based on the resolution of touch input sensor array 125. Additionally, during the "self capacitance" scan, one or more selected rows may be scanned, in addition to selected columns 530-1 through 530-y. For example, as shown in FIG. 5B, rows 540-1 and 540-2, being the rows on touch surface 120 nearest border 115, may be selected and scanned.

Figure 6A:
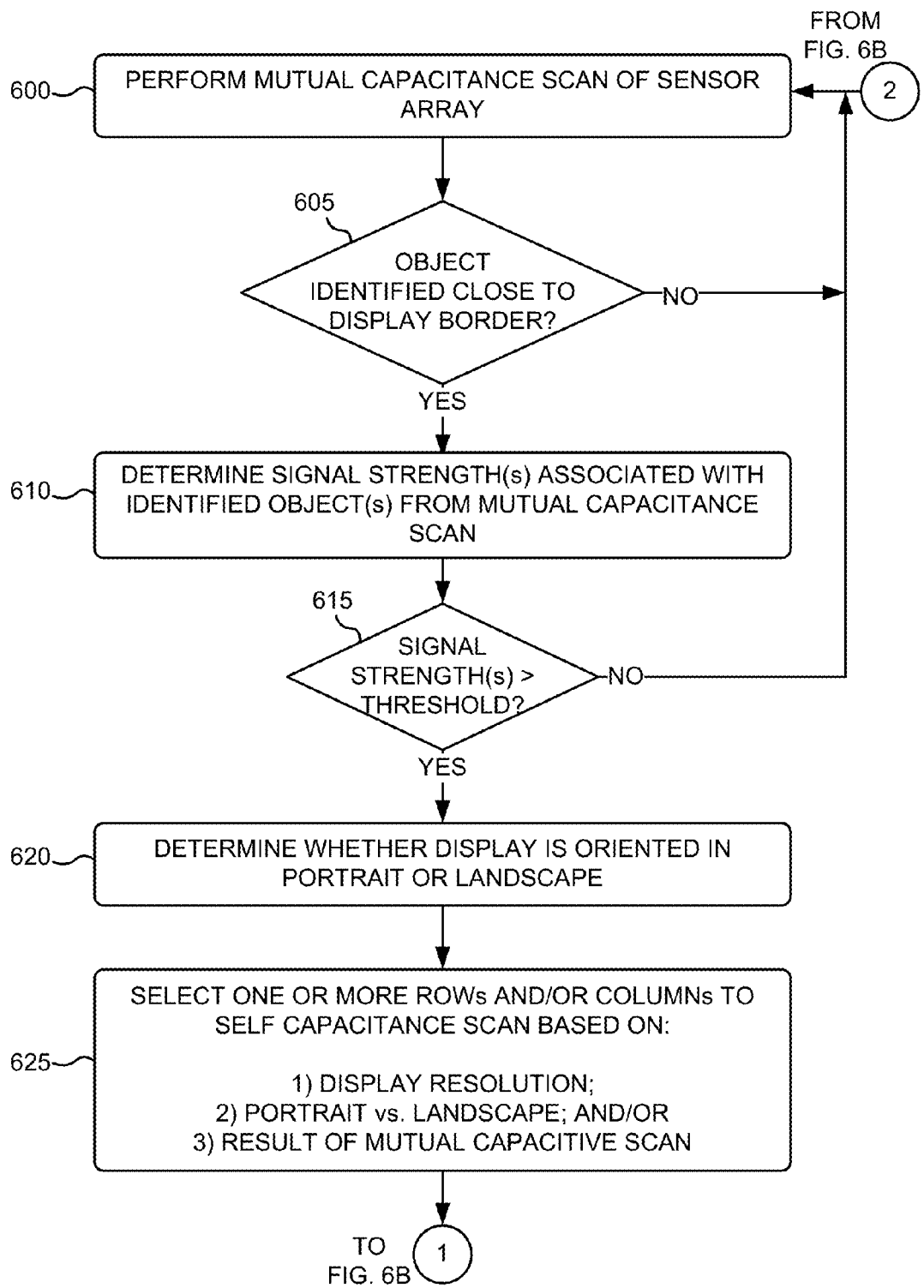
FIGS. 6A and 6B are flow diagrams illustrating an exemplary process for dynamic touch sensor scanning to identify accidental and/or false touch panel inputs.
Figure 6B:
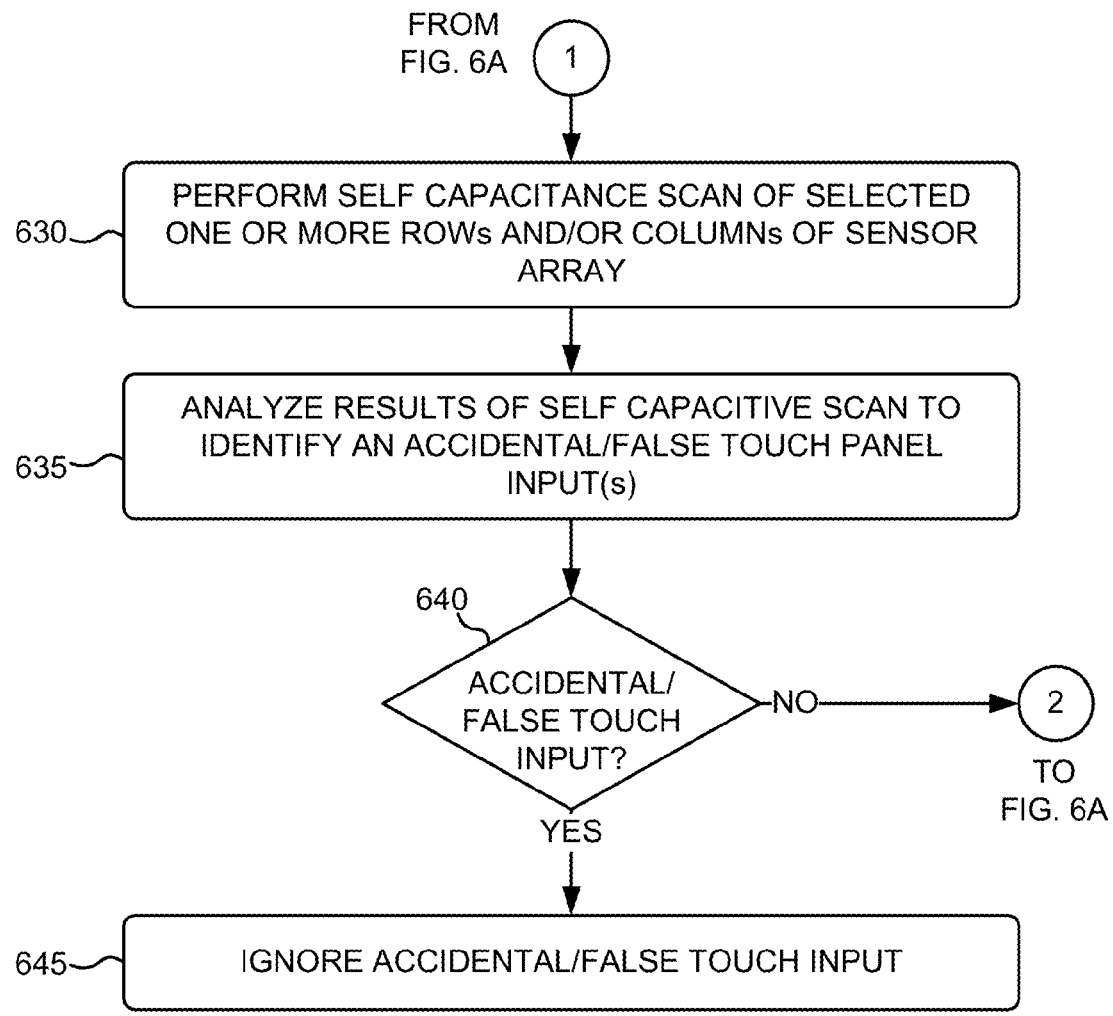

FIGS. 6A and 6B are flow diagrams illustrating an exemplary process for dynamic touch sensor scanning to identify accidental and/or false touch panel inputs. The exemplary process of FIGS. 6A and 6B may be performed by components of electronic device 100, such as those components depicted in FIG. 3. The exemplary process of FIGS. 6A and 6B may be executed continuously during operation of device 100 when touch panel 105 is active (e.g., powered on) and accepting user input.

The exemplary process may include mutual capacitance scanning unit 300 performing a "mutual capacitance" scan of touch input sensory array 125 (block 600). Mutual capacitance scanning unit 300 applies a voltage to a parallel plate capacitor formed at an intersection of each row of layer 130 and column of layer 135 of sensor array 125. When a finger(s), or other object(s), touches touch surface 120, a capacitance $C_{row-column}$ 150 associated with an intersection, at a location of the touch, of a row electrode of layer 130 and a column electrode of layer 135 decreases. By measuring voltage and/or current at each row/column intersection, mutual capacitance scanning unit 300 detects the decreases in capacitance at one or more row/column intersections, and the location of the finger(s), or other object(s), touching touch surface 120 of device 100 may thereby be determined.

Scanning unit 300 may determine, based on the "mutual capacitance" scan of touch input sensor array 130 (i.e., block 600), whether an object has been identified close to border 115 of the display (block 605). Measured capacitances at one or more row and column intersections may be analyzed to identify capacitance values that indicate an object touching touch surface 120 close to border 115 of external face 110 of device 100. The determined proximity (or "closeness") of the object touching touch surface 120 to border 115 may be dependent upon the size of the touch screen display. For example, if face 110 of device 100 is 5 inches by 3 inches, then a "close" proximity to border 115 may include touch input occurring upon touch surface 120 within one eighth of an inch of border 115.

If no object is identified as being close to border 115 (NO—block 605), then the exemplary process returns to block 600 with the performance of another mutual capacitance scan of touch input sensor array 125. If an object(s) is/are identified as being close to border 115 of device 100 (YES—block 605), then mutual capacitance scanning unit 300 determines the signal strength(s) associated with the identified object(s) from the mutual capacitance scan (i.e., block 600) of touch input sensory array 125 (block 610). The level of capacitance measured at each row/column intersection, associated with the object(s) identified close to border 115 of face 110 of device 100, of touch input sensor array 125 corresponds to the "signal strength" at that position. In a mutual capacitance scan of touch input sensor array 125, capacitance at each parallel plate capacitor formed at each row and column intersection typically decreases with a touch at that location. Therefore, a lower measured mutual capacitance corresponds to a higher "signal strength" and an identified touch at a location on touch input sensor array 125.

If the determined signal strength(s) are equal to or lesser than a threshold (NO—block 615), indicating too low of a signal strength(s), then the exemplary process returns to block 600 with the performance of another mutual capacitance scan of touch input sensor array 125. If the measured mutual capacitance at each row/column intersection of touch input sensor array 125 is still sufficiently high, corresponding to a low signal strength, than the identified object or touch close to the border 115 may be ignored for purposes of additional scanning in block 630. If the determined signal strength(s) are greater than a threshold (YES—block 615), then dynamic sensor row(s)/column(s) selection unit 310 may determine whether the display of device 100 is oriented in portrait or landscape (block 620). Selection unit 310 may determine the orientation of face 110 of device 100 based on, for example, an accelerometer output of device 100. If the measured mutual capacitance at each row/column intersection of touch input sensor array 125 is sufficiently low, corresponding to a high signal strength, than the process may continue with a "self capacitance" scan (i.e., block 630 below) of touch input sensor array 125 to determine whether the identified object(s) should be ignored as false or accidental "touches" upon touch surface 120.

Dynamic sensor row(s)/column(s) selection unit 310 selects one or more row(s) and/or column(s) of touch input sensor array 125 to scan based on: 1) a display resolution of device 100; 2) a portrait vs. landscape orientation of face 110 of device 100; and/or 3) results of the mutual capacitance scan (i.e., block 600) (block 625). For example, if touch input sensor array 125 has 13×23 sensors (columns×rows) and the touch display screen size is 5 inches, equaling a width and height of 60×110 mm, then each sensor electrode of sensor array 125 may have a sensor pitch of 4.6×4.8 mm. In this example, with a display screen size of 5 inches and a 13×23 sized sensor array, a scan of self capacitance sensor array 125 can be made on every fourth row sensor, when device 100 is oriented in portrait, and still detect small objects (e.g., small fingers) close to border 115 of touch surface 120. With the same example device 100, and device 100 being oriented in landscape, a different selection of rows(s) and/or column(s) may occur. For example, assuming a 13×23 (columns×rows) sensor array, every third column may be selected for scanning when device 100 is oriented in landscape. The results of the mutual capacitive scan (i.e., block 600) may also be used to trigger the self capacitive scan (i.e., block 630). For example, if there is an object on touch surface 120 near border 115 of device 100 that is identified (in block 605) as being multiple fingers by the mutual capacitive scan, then a self capacitive scan may not be needed and no rows and/or columns may be selected for self capacitive scanning in block 625.

Self capacitance scanning unit 310 performs a scan of the selected one or more rows and/or columns (selected in block 625) of touch input sensor array 125 (block 630). Self capacitance scanning unit 310, using associated circuitry, applies a voltage to each selected row of layer 130 and/or to each selected column of layer 135. During this "self capacitance" scanning of touch input sensor array 125, the current on each selected row and column electrode may be measured to ground to determine the change in capacitance of each selected row and column electrode. When a finger, or other object, is near, or touching, touch surface 120, a capacitance $C_{row}$ 140 associated with a selected row electrode of layer 130 increases, and a capacitance $C_{column}$ 145 associated with a selected column electrode of layer 135 increases, thereby permitting interpolation of the location of the touch input as being the intersection of the row and column. Dynamically reducing the number of rows and/or columns to self capacitive scan by scanning unit 310 (e.g., scanning very third, fourth, or some other multiple number of rows) reduces scanning time, reduces processing load, and decreases an amount of time to classify a touch input near border 115 of device 100 as accidental or false.

Accidental/false input detection unit 330 analyzes the results of the self capacitance scan (of block 630) to identify an accidental/false touch panel input (block 635) and determines, based on the analysis of block 635, if an accidental and/or false touch input has been identified (block 640). Accidental/false input detection unit 330 analyzes the measured capacitances of the the selected rows and/or the selected columns of touch input sensor array 125 to classify the touch panel inputs as being associated with touch positions or shapes that indicate an accidental or false touch input. For example, if the shape of the touch input upon the selected row(s) and/or column(s) indicates a palm of the user's hand near border 115 of touch surface 120, then the touch input may be classified as accidental or inadvertent. Alternatively, if the shape of the touch input indicates a number of fingers along the side adjacent border 115, the touch input may be classified as accidental or inadvertent. If no accidental/false touch input is identified (NO—block 640), then the exemplary process may return to block 600. The touch input(s) may, in block 635, either be identified as a valid touch input and, therefore, not an accidental/false touch panel input, or may be identified only as not being an accidental/false touch input. If one or more accidental/false touch inputs have been identified (YES—block 640), then detection unit 330 provides an instruction to ignore the identified accidental/false touch input(s) (block 645). Upon classification of the touch input(s) as accidental or false, processing unit 220 of device 100 may choose to ignore the associated touch input(s).

The foregoing description of the embodiments described herein provides illustration and description, but is not intended to be exhaustive or to limit the invention to the precise form disclosed. Modifications and variations are possible in light of the above teachings or may be acquired from practice of the invention. For example, while a series of blocks has been described with respect to FIGS. 6A and 6B, the order of the blocks may be varied in other implementations. Moreover, non-dependent blocks may be performed in parallel.

Certain features described herein may be implemented as "logic" or as a "unit" that performs one or more functions. This logic or unit may include hardware, such as one or more processors, microprocessors, application specific integrated circuits, or field programmable gate arrays, software, or a combination of hardware and software.

The term "comprises" or "comprising" as used herein, including the claims, specifies the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Further, the phrase "based on," as used herein is intended to mean "based, at least in part, on" unless explicitly stated otherwise.

What is claimed is:

1. A method, comprising:
    performing, at a device having a touch screen display, a mutual capacitance scan of rows and columns of an array of capacitive touch sensors associated with the touch screen display;
    detecting, by analysis of results from the performance of the mutual capacitance scan, presence of touch input adjacent a border of the touch screen display during receipt of additional touch input by a user to control the device;
    in response to detecting the presence of the touch input adjacent the border of the touch screen display, performing a self capacitance scan with a subset of the rows and with a subset of the columns that correspond to an area of the touch screen display adjacent the border;
    analyzing results of the self capacitance scan to identify that the touch input adjacent the border of the touch screen display is an accidental or false touch input on the touch screen display corresponding to the user grasping the device; and
    ignoring the detected touch input made with the mutual capacitance scan adjacent the border of the touch screen display.

2. The method of claim 1, wherein the touch screen display of the device includes a face that further includes a touch surface surrounded by the border, with the array of capacitive touch sensors being disposed beneath the touch surface.

3. The method of claim 1, wherein performing the mutual capacitance scan of rows and columns of the array of capacitive touch sensors comprises:
    measuring a capacitance of a respective parallel plate capacitor formed at each intersection of each of the rows and each of the columns of the array, and
    wherein performing the self capacitance scan comprises:
    applying a voltage to each row of the subset of rows and each column of the subset of columns of the array of capacitive touch sensors and measuring the current to ground on each row of the subset of rows and each column of the subset of columns to determine a respective change in capacitance.

4. The method of claim 1, wherein the subset of the rows and the subset of the columns of the array of capacitive touch sensors are selected based on whether the device is oriented in portrait or in landscape.

5. The method of claim 1, wherein the subset of the rows and the subset of the columns of the array of capacitive touch sensors are selected based on a resolution of the array of capacitive touch sensors.

6. The method of claim 1, wherein the subset of the rows and the subset of the columns of the array of capacitive touch sensors are selected based on results of the mutual capacitance scan of the array of capacitive touch sensors.

7. The method of claim 1, wherein the subset of the rows and the subset of the columns of the array of capacitive touch sensors are selected based on measured signal strengths associated with the mutual capacitance scan of the array of capacitive touch sensors.

8. The method of claim 1, wherein analysis of the results from the mutual capacitance scan comprises:
    determining signal strengths associated with the mutual capacitance scan of the array of capacitive touch sensors;
    determining if the signal strengths are greater than a signal strength threshold; and
    determining that the touch input adjacent the border is present if the signal strengths are greater than a signal strength threshold.

9. A device, comprising:
    a touch screen display comprising:
        a touch surface surrounded by a border;
        a first layer of capacitive touch sensors including multiple rows of sensor electrodes disposed under the touch surface, and
        a second layer of capacitive touch sensors including multiple columns of sensor electrodes disposed under the touch surface;
    a first scanning unit configured to perform a mutual capacitance scan of the multiple rows and columns of the layers of capacitive touch sensors and detect, by analysis of results from the performance of the mutual capacitance scan, presence of touch input adjacent the border of the touch screen display during receipt of additional touch input by a user to control the device;
    a second scanning unit configured to perform, in response to detecting the presence of the touch input adjacent the border of the touch screen display, a self capacitance scan with a subset of the rows and with a subset of the columns that correspond to an area of the touch screen display adjacent the border;
    an input detection unit configured to analyze results of the self capacitance scan to identify that the touch input adjacent the border of the touch screen display is an accidental touch input on the touch screen display corresponding to the user grasping the device and ignore the detected touch input made with the mutual capacitance scan adjacent the border of the touch screen display.

10. The device of claim 9, wherein the mutual capacitance scan of the multiple rows and the multiple columns of the capacitive touch sensors comprises:
   measuring a capacitance of a respective parallel plate capacitor formed at each intersection of each of the multiple rows and each of the multiple columns of the capacitive touch sensors.

11. The device of claim 10, wherein the self capacitance scan comprises:
   applying a voltage to each row of the subset of rows and each column of the subset of columns of the array of capacitive touch sensors and measuring the current to ground on each row of the subset of rows and each column of the subset of columns to determine a respective change in capacitance.

12. The device of claim 9, wherein the device is a hand-held electronic device.

13. The device of claim 9, wherein the device comprises one of a cellular radiotelephone, a satellite navigation device, a smart phone, a Personal Communications System (PCS) terminal, a personal digital assistant (PDA), a gaming device, a media player device, a tablet computer, a surface table, a wearable computer, or a digital camera.

14. The device of claim 9, wherein the subset of the rows and the subset of the columns of the capacitive touch sensors are selected based on one or more of:
   1) whether the device is oriented in portrait or in landscape,
   2) a resolution of the capacitive touch sensors, or
   3) results of the mutual capacitance scan of the capacitive touch sensors.

15. The device of claim 9, wherein, during the analysis of results from the performance of the mutual capacitance scan, the first scanning unit is further configured to:
   determine signal strengths associated with the mutual capacitance scan of the capacitive touch sensors,
   determine if the signal strengths are greater than a signal strength threshold, and
   determine that the touch input adjacent the border is present if the signal strengths are greater than the signal strength threshold.

* * * * *